W. H. CRISSEY.
STORAGE BATTERY AND METHOD OF MAKING IT.
APPLICATION FILED MAY 12, 1921.
1,415,804.
Patented May 9, 1922.
2 SHEETS—SHEET 1.
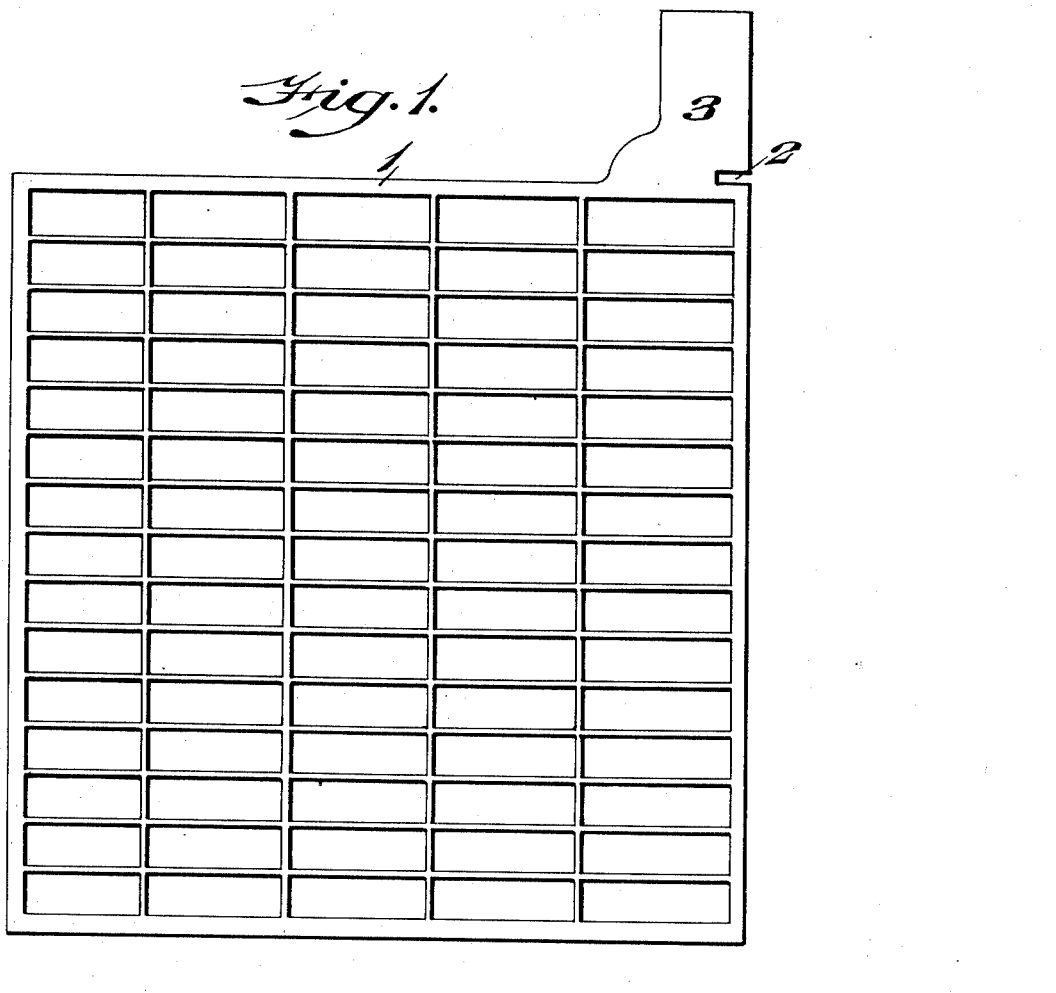
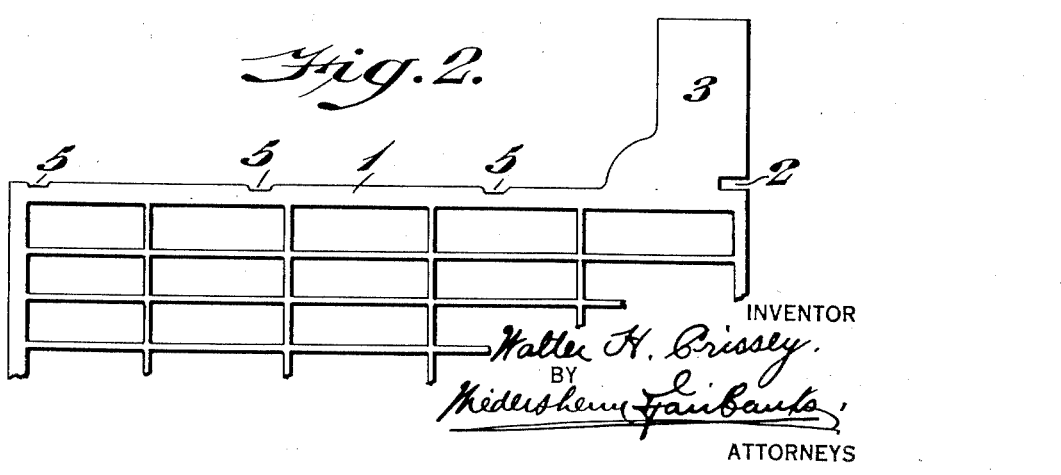
INVENTOR
Walter H. Crissey.
BY
ATTORNEYS

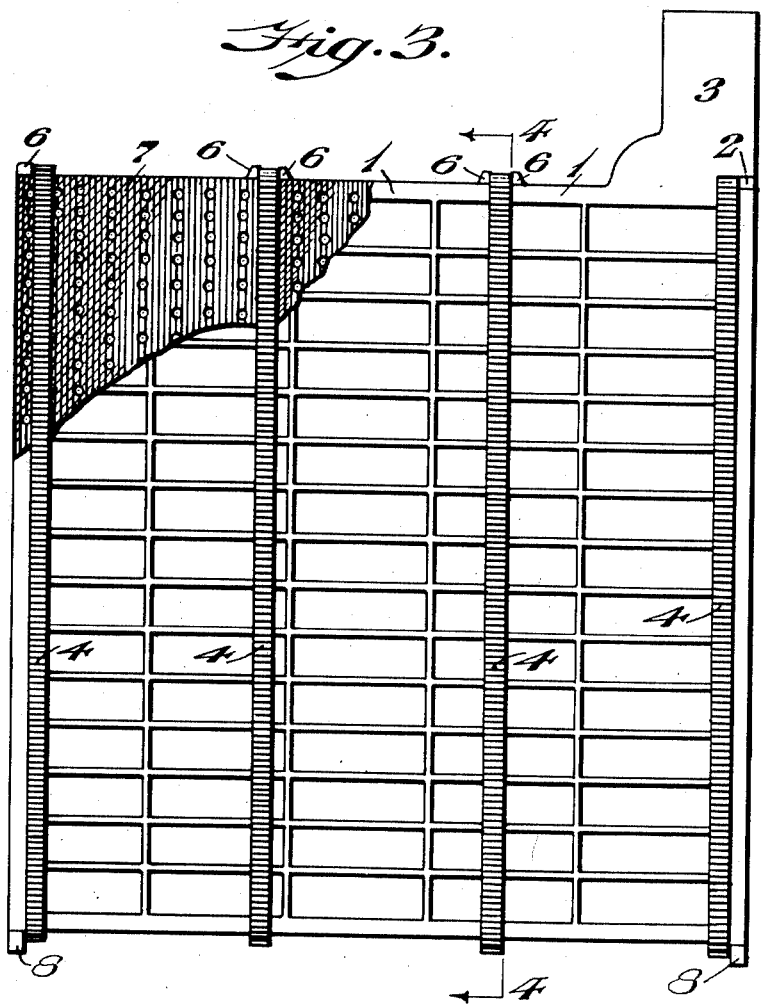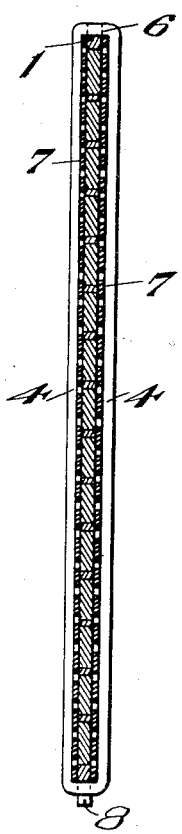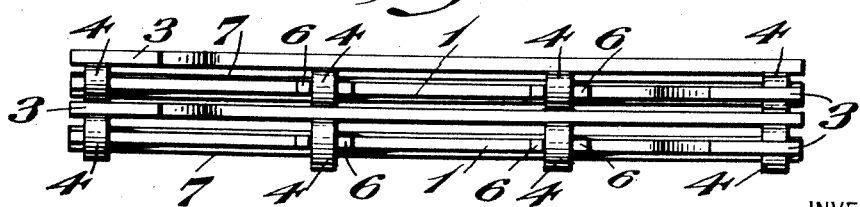

UNITED STATES PATENT OFFICE.

WALTER H. CRISSEY, OF READING, PENNSYLVANIA.

STORAGE BATTERY AND METHOD OF MAKING IT.

1,415,804.  Specification of Letters Patent.  Patented May 9, 1922.

Application filed May 12, 1921. Serial No. 468,849.

*To all whom it may concern:*

Be it known that I, WALTER H. CRISSEY, a citizen of the United States, residing at Reading, county of Berks, State of Pennsylvania, have invented a new and useful Storage Battery and Method of Making It, of which the following is a specification.

My invention relates to a storage battery and more particularly to one in which I eliminate the necessity of employing the usual type of wood separators or insulators.

My invention comprehends a novel construction of a storage battery wherein the positive and negative plates are insulated from each other in such a manner that the entire area of the active material is at all times effective.

In carrying out my invention, I apply to either the positive or negative plates a desired number of insulating rings which are preferably of hard rubber and which secure in position against either side of the negative or positive plates a perforated sheet of hard rubber so that when the plates are assembled there is no possibility of short circuiting due to sections of positive active material becoming loosened and falling against an adjoining plate of opposite polarity or of excessive sponging or expansion of negative material in the negative plate bridging across to an adjoining plate of opposite polarity. In order to secure the insulating rings in place, the battery plates can be recessed or projections can be preformed on the plates or formed on the plates after the rings have been positioned.

My present invention is especially adapted to be employed in storage batteries of the house lighting type since the weight of the battery and the space taken by it is not considered a factor. The battery plates are preferably constructed in such a manner that when placed in the jar they will be spaced a desired distance above the bottom of the jar.

It further comprehends a novel construction of battery plate and a novel construction of insulating members co-operating therewith.

It further consists of other novel features of construction all as will be hereinafter fully set forth.

For the purpose of illustrating my invention, I have shown in the accompanying drawings typical embodiments thereof which are at present preferred by me, since these embodiments will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in front elevation, a battery plate, embodying my invention.

Figure 2 represents, in front elevation, a portion of another form of battery plate, embodying my invention.

Figure 3 represents, in front elevation, a battery plate and its adjuncts, embodying my invention, and showing more particularly the manner in which the insulating rings are secured in position and how they in turn secure a perforated hard rubber active material retaining sheet in proper position.

Figure 4 represents a section on line 4—4 of Figure 3.

Figure 5 represents a top plan view of a plurality of battery plates in assembled position.

Similar numerals of reference indicate corresponding parts.

Referring to the drawings.

For convenience of manufacture, the battery plates are preferably cast in the form seen in Figure 1, it being of course understood that the form and arrangement of the grid portion of the plate may vary widely in practice and that the size, shape and arrangement of the apertures can be of any desired or conventional type so long as they will retain the requisite amount of material when in finished form. It will therefore be understood that the rectangular arrangement of the walls of the apertures through the plates is conventional only. The top wall 1 of the frame of the grid is preferably smooth when originally cast but a slot or recess 2 is formed in the side wall of the plate lug 3. 4 designates the insulating members which are preferably in the form of endless rings which are preferably constructed of hard rubber. These insulating members 4 are secured in spaced relationship along the side walls of a battery plate and this can be accomplished in different ways. In Figure 2, I have shown the top frame member 1 as provided with the recesses or notches 5 which receive the insulating members 4 in order to secure them in spaced relationship. The insulating member 4 in proximity to the plate lug 3 is inserted into the slot 2 in order to retain it in its proper position.

In Figures 3 to 5 inclusive, instead of employing a notch or recess as 5 in Figure 2, I employ a mechanical equivalent thereof by forming abutments 6 on the top frame member or rib 1. This can preferably be done by burning these abutments in place by means of a flame and in order to have these abutments all located at standard distances from each other, I preferably employ a protector in the form of a template which mechanically holds the insulating members 4 in position and protects such insulating members during the formation of the abutment 6. Intermediate the side wall of the plate I preferably employ two abutments while at the side furthest removed from the plate lug 3, I preferably employ but one abutment. It will be understood that the insulating members 4 are placed over the usual apertured cover 7 in case such is employed.

In accordance with my present invention one does not lose any of the area of the active material. The insulating members 4 are preferably secured only on the positive plate but if preferred they can be placed on the negative plate instead of the positive plate and the positive and negative plates will be properly insulated from each other. If the abutments are burnt on the plate it will be apparent that they can be formed simultaneously on a large number of plates and the positive and negative plates can be assembled or paired together much more quickly than can be accomplished in the methods heretofore practiced.

It will be apparent from the foregoing that in carrying out the method of insulating plates in accordance with my present invention, I secure to the plates in spaced relationship a plurality of insulating members which are preferably in the form of annular rings with abutments for maintaining such insulating members in spaced relationship, the abutments being formed prior to or subsequently to the placement of the insulating members on a battery plate.

The bottom of a battery plate preferably has formed on it the downwardly projecting members 8 which can be burnt on or formed thereon as desired. In connection with these plates, I employ a jar having its bottom ribs of sufficient height to retain a desired amount of active material in the bottom of the jar and a cover is employed with an insulating gasket about the jar and the plate lug or post.

In accordance with my present invention, I render it unnecessary to use a wood separator or insulator. A hard rubber ring is shrunk when heated and in an expanded condition over the end of the plate and seating when cooled and contracted in seats cast or formed on the grid of the battery plate. The end rings are held on the plate at the bottom by feet which may be burned in place if desired by the use of a lead burning flame. The perforated rubber sheets 7 act as an active material retainer and as an additional insulator and may be used against the face of the positive or negative plate to be set against each side of a positive or of a negative plate and the insulating rings are slipped over them so that the rubber sheets will prevent any loosening of the sections of the positive active material and prevent it from bridging across to the opposite plate and short circuiting or preventing short circuiting between plates that may be caused by excessive sponging of the negative active material.

It will be further apparent that by eliminating the wood separators ordinarily employed, I eliminate any local action or internal discharge in the cell and permit greater rates of charge or discharge. The conductivity of the cell is increased or the internal resistance decreased by the elimination of the wood separator. The separator and positive group or the separator and negative group when once assembled form a complete unit making it unnecessary to individually handle any separators in replacing any leaky cells, since all that it is necessary to do is to part the negative and positive elements and pair them together again.

It will now be apparent that I have devised a new and useful construction of a storage battery and method of making it which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages

Having thus described my invention, what I claim as new and desire to secure by Letters Patent, is:—

1. The method of insulating a battery plate, which consists in forming a battery plate with seats, heating hard rubber rings to expand them, passing said rings over said plates into register with said seats, and allowing said rings to cool, whereby they contract and are positively locked in said seats and retained thereby in spaced relationship on said plate.

2. The method of insulating a battery plate. which consists in forming a battery plate with seats, positioning hard rubber perforated plates on opposite sides of said battery plates, heating hard rubber rings to expand them, passing said rings over said plates into register with said seats, and allowing said rings to cool, whereby they contract and are positively locked in said seats and retained thereby in spaced relationship on said plates.

3. The combination with a battery plate having seats and a plate lug with a seat, of perforated hard rubber plates on opposite sides of said battery plate, and hard rubber insulating rings in spaced relationship around said plate and shrunk into engagement with said seats.

WALTER H. CRISSEY.

Witnesses:
C. D. McVay,
N. Bussinger.